(12) United States Patent
Lind

(10) Patent No.: US 12,469,168 B2
(45) Date of Patent: Nov. 11, 2025

(54) LOW LIGHT GAZE DETECTION IN A VEHICLE ENVIRONMENT

(71) Applicant: Smart Eye AB, Gothenburg (SE)

(72) Inventor: Henrik Lind, Torslanda (SE)

(73) Assignee: Smart Eye AB, Gothenburg (SE)

( * ) Notice: Subject to any disclaimer, the term of this patent is extended or adjusted under 35 U.S.C. 154(b) by 298 days.

(21) Appl. No.: 18/230,212

(22) Filed: Aug. 4, 2023

(65) Prior Publication Data

US 2024/0046506 A1 Feb. 8, 2024

Related U.S. Application Data

(60) Provisional application No. 63/395,365, filed on Aug. 5, 2022.

(51) Int. Cl.
*G06V 20/59* (2022.01)
*G06T 5/70* (2024.01)
(Continued)

(52) U.S. Cl.
CPC .................. *G06T 7/73* (2017.01); *G06T 5/70* (2024.01); *G06T 7/0002* (2013.01); *G06T 7/246* (2017.01); *G06V 20/597* (2022.01); *G06T 2207/10016* (2013.01); *G06T 2207/10048* (2013.01); *G06T 2207/20081* (2013.01);
(Continued)

(58) Field of Classification Search
CPC .......... G06T 7/73; G06T 5/70; G06T 7/0002; G06T 7/246; G06T 2207/10016; G06T 2207/10048; G06T 2207/20081; G06T 2207/20084; G06T 2207/30201;
(Continued)

(56) References Cited

U.S. PATENT DOCUMENTS 5,337,802 A 8/1994 Kajino et al.
9,079,479 B2 7/2015 Chen et al.
(Continued)

FOREIGN PATENT DOCUMENTS

CA 2954705 A1 1/2017

OTHER PUBLICATIONS

Liu et al.: "Real-Time Eye Detection and Tracking for Driver Observation Under Various Light Conditions"; Jun. 2002; Intelligent Vehicle Symposium; pp. 344-351. (Year: 2002).*

*Primary Examiner* — Siamak Harandi
(74) *Attorney, Agent, or Firm* — Adams Intellex, PLC

(57) ABSTRACT

Image analysis is used for low light gaze detection in a vehicle environment. An infrared (IR) light source is sent toward an individual within a vehicular environment. IR light reflections are received from the individual by at least one video camera. At least one eye of the individual is obscured by a semitransparent material. Low accuracy tracking of the individual is evaluated using the IR light reflections through the semitransparent material. A signal-to-noise ratio for a sequence of video image frames is enhanced using the IR light reflections of the individual through the semitransparent material. Enhancing enables detection of feature points in an eye region for the individual. Eye location for the individual is determined based on results of the enhancing a signal-to-noise ratio. Real-time gaze direction of a pupil is derived for the at least one eye. The deriving is based on the determining the eye location.

26 Claims, 7 Drawing Sheets

(51) Int. Cl.
  *G06T 7/00* (2017.01)
  *G06T 7/246* (2017.01)
  *G06T 7/73* (2017.01)

(52) U.S. Cl.
  CPC .............. *G06T 2207/20084* (2013.01); *G06T 2207/30201* (2013.01); *G06T 2207/30268* (2013.01)

(58) Field of Classification Search
  CPC ............ G06T 2207/30268; G06T 5/50; G06V 20/597; G06V 10/143; G06V 40/18
  See application file for complete search history.

(56) References Cited

U.S. PATENT DOCUMENTS

| | | |
|---|---|---|
| 9,955,511 B2 | 4/2018 | Spero |
| 10,166,978 B2 | 1/2019 | Lorenz |
| 10,399,573 B1 | 9/2019 | Chan et al. |
| 10,429,857 B2 | 10/2019 | Weaver et al. |
| 10,527,440 B2 | 1/2020 | Yalla |
| 10,648,825 B2 | 5/2020 | Maekawa et al. |
| 10,699,152 B1 | 6/2020 | Adam et al. |
| 11,025,834 B2 | 6/2021 | Ulveland |
| 11,221,434 B2 | 1/2022 | Frank et al. |
| 11,280,671 B2 | 3/2022 | Brown et al. |
| 2003/0031344 A1* | 2/2003 | Maurer ................ G06V 40/16 382/103 |
| 2016/0103484 A1* | 4/2016 | Guo ..................... A61B 3/113 345/156 |
| 2020/0280668 A1 | 9/2020 | Park et al. |

\* cited by examiner

LOW LIGHT GAZE DETECTION IN A VEHICLE ENVIRONMENT

RELATED APPLICATIONS

This application claims the benefit of U.S. provisional patent application "Low Light Gaze Detection In A Vehicle Environment" Ser. No. 63/395,365, filed Aug. 5, 2022.

The foregoing application is hereby incorporated by reference in its entirety.

FIELD OF ART

This application relates generally to image analysis and more particularly to low light gaze detection in a vehicle environment.

BACKGROUND

Travel by virtually all modes of transportation can challenge travelers on many levels. Whether using personal vehicles or taking advantage of public transportation offerings, transportation routinely subjects travelers to incredibly demanding situations. The situations include being trapped in gridlocked traffic, waiting in seemingly endless security check lines prior to boarding, and traveling in crowded vehicles, among many others. The reasons for travel are varied and personal. Travel can include moving from one geographic location to another for financial reasons such as commuting to and from work or school. Travel can be undertaken for personal reasons such as vacation, recovery, relaxation, adventure, or for exercise, among many others. Some travel has a dark side. The individuals may be unwilling travelers, such as displaced persons fleeing war, famine, natural disasters, or economic hardship. The modes of transportation chosen for travel are numerous and varied. Transportation choices are premised on availability, convenience, and usually cost. Transportation choices further depend on the travel purposes including crossing town, hauling goods, or safety. The transportation modes from which a traveler chooses include air, ground, and water transportation.

Valuable time is consumed getting to, waiting for, and traveling in vehicles. Some travelers use public transportation networks, such as buses, trains, and airplanes; ride-sharing services such as Lyft™ and Uber™; personal vehicles; and car sharing services such as Zipcar™ to travel among their destinations. Travel includes daily commutes to work or school, transportation to extracurricular activities such as athletic practices and music or language lessons, taking the pets to the veterinary, shopping, running errands, taking business or vacation trips, and transportation for many other purposes. The transportation needs are defined by varying degrees and are met by a variety of vehicles. Vehicle choices are often dictated by where people live. The vehicles can range from cars and motorcycles; to buses, trains, and subways; to ride and ride sharing services; and even to unmotorized vehicles such as bicycles, skateboards, or scooters. Travel is time consuming at its best, and treacherous at its worst. Rush hour traffic or accidents; inexperienced, incompetent, impaired, or dangerous vehicle operators; and poorly maintained roads all complicate travel. The difficulties of transportation are further compounded by operating an unfamiliar vehicle, driving in an unfamiliar city, navigating an unfamiliar public transportation network, and traffic travel lane challenges. These transportation difficulties can have catastrophic consequences. Angry, distracted, sleepy, or impaired, vehicle operators can cause vehicular accidents and injury to themselves, pedestrians, bicyclists, animals, and property.

SUMMARY

Image analysis techniques are disclosed for low light gaze detection in a vehicle environment. As an individual is operating a vehicle, the individual's eyes will gaze in various directions. Some of the directions enable the individual to gaze outside of the vehicle which they are operating. These outside gazes include facing forward to engage with a path of travel, looking side to side to check for other vehicles, and so on. Other directions of gaze are inside the vehicle. These latter directions enable the individual to monitor gauges and instruments positioned in the vehicle's instrument cluster, to view climate control settings, to view and engage with an information center or console, and so on. Determining the individual's gaze direction can accomplish a variety of objectives. The gaze direction can be used to determine what information should be presented to the individual, can determine whether the individual is attentive or falling asleep, and can be used for other practical and safety purposes. Determining the gaze direction of the individual can be based on deriving the real-time gaze direction of a pupil of an individual's eye. The deriving is based on being able to "see" the pupil of an eye. If the individual is wearing tinted glasses, or if some other semi-transparent material is positioned between the individual's eyes and a camera used to track gaze direction, then the resulting images of the individual will have a low signal-to-noise ratio (SNR). To compensate for the low SNR images, image analysis techniques, such as adding a sequence of images together, pixel binning, and so on, are used to enhance the low SNR. The adding, binning, etc., can be repeated until an SNR that is sufficiently high to enable gaze direction derivation is attained.

A computer-implemented method for image analysis is disclosed comprising: sending an infrared (IR) light source toward an individual within a vehicular environment; receiving, by at least one video camera, IR light reflections from the individual, wherein at least one eye of the individual is obscured by a semitransparent material; evaluating low accuracy tracking of the individual using the IR light reflections through the semitransparent material; enhancing a signal-to-noise ratio (SNR) for a sequence of video image frames using the IR light reflections of the individual through the semitransparent material, wherein the enhancing enables detection of feature points in an eye region for the individual; determining eye location for the individual based on results of the enhancing a signal-to-noise ratio; and deriving real-time gaze direction of a pupil for the at least one eye, wherein the deriving is based on the determining the eye location. In embodiments, the evaluating the low accuracy tracking is accomplished by calculating the SNR for the sequence of video image frames captured by the at least one video camera. In embodiments, the enhancing the SNR is further based on the calculating the SNR for the evaluating the low accuracy tracking. In embodiments, the IR light source includes near infrared wavelength light. Some embodiments comprise detecting that the individual is wearing tinted glasses. And some embodiments comprise summing a sequence of at least two video frames captured by the at least one video camera as part of the enhancing the SNR.

Various features, aspects, and advantages of various embodiments will become more apparent from the following further description.

BRIEF DESCRIPTION OF THE DRAWINGS

The following detailed description of certain embodiments may be understood by reference to the following figures wherein.

DETAILED DESCRIPTION

Figure 1:
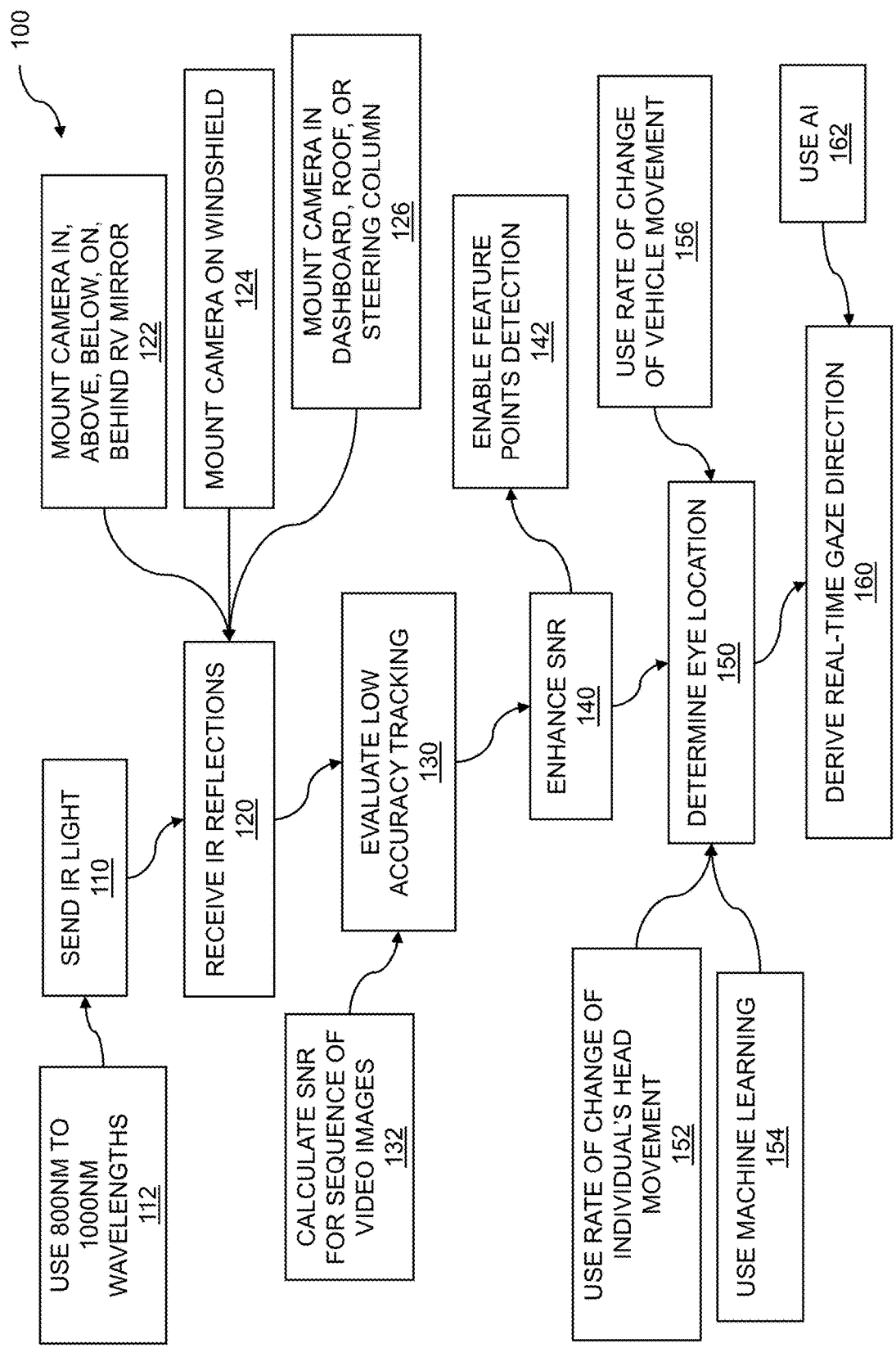
FIG. 1 is a flow diagram for low light gaze detection in a vehicle environment.

Modern vehicles have a dizzying array of instruments, displays, consoles, controls, and other sources of information that are provided to an individual within the vehicle. In fact, some have likened the interior of a modern automobile to resemble more closely the cockpit of a high-performance aircraft than the dashboards of vehicles manufactured even a decade ago. Whether information is provided to the individual using traditional gauges, LCD panels, or heads-up displays, among other techniques, the individual is required to gaze in multiple directions in order to operate their vehicle, to monitor vehicle status, and so on. Determining gaze direction can be accomplished by using a light source such as an infrared (IR) light source to illuminate the individual's face, and a video camera to capture IR light reflections from the individual's face. In embodiments, the light source is a near infrared (NIR) light source. The image captured by the camera can be analyzed to determine eye location, and from the eye location, to derive a gaze direction. However, the images of the IR reflections from the individual's face can have a low signal-to-noise ratio (SNR). The low SNR can result from the individual wearing sunglasses, thereby partially obscuring the eyes. The magnitude of the IR light is reduced once when traveling through the sunglasses to the individual's face, and again when the reflections pass back through the sunglasses and to the video camera. Further, the view from the IR source to the individual and back to the video camera can be occluded by a spoke of a steering wheel or the individual's arm as the individual is executing a turn of the vehicle. Furthermore, occlusion can occur based on a location of a semitransparent surface in front of a camera and its associated light source allowing the camera to be hidden.

Image analysis techniques for low light gaze detection in a vehicle environment are disclosed. The gaze direction of the individual within a vehicle can be determined to provide information to the individual; to enable vehicle controls; to determine that the individual is alert, undistracted, and operating the vehicle safely; and so on. During vehicle operation, the individual within the vehicle will gaze in various directions. The gaze directions can include gazes outside the vehicle toward a direction of travel, a travel lane, other vehicles, and the like. The gaze directions can further include gazes within the vehicle. The latter gazes can view instruments, controls, displays, etc., positioned within the vehicle. As travel speed increases, changes in gaze direction can accelerate. As a result, timely derivation of gaze direction is critical to safe vehicle operation. In addition to determining how the individual is interacting with the vehicle, vehicle information sources and controls, etc., determining gaze direction, which is based on locating the individual's eyes in a video frame that includes the individual, can be used to detect microsleep, inattention, distraction, and other cognitive states associated with the individual that can indicate an unsafe vehicle operation situation.

Determining the gaze direction of the individual can be based on deriving the real-time gaze direction of a pupil of at least one eye associated with the individual. The deriving is based on locating the pupil of an eye visible within the video frame. If the individual is wearing tinted glasses, or a semitransparent material is positioned between the individual's eyes and a camera used to track gaze direction, then the resulting images of the individual will have an unusably low signal-to-noise ratio (SNR). To compensate for the low SNR images, image analysis techniques are applied. Sequences of images or image frames are added together, resulting in a single image with a higher SNR. Further images are added to further increase the SNR. Other image analysis techniques are based on pixel binning, where adjacent pixels containing image data are added together to form a super pixel. The super pixel has a higher SNR than the individual pixels summed to form the super pixel. The adding, binning, etc., can be repeated until an SNR that is high enough to enable gaze direction derivation is attained.

FIG. 1 is a flow diagram for low light gaze detection in a vehicle environment. The gaze detection can be based on determining eye location for an individual within video frames. The video frames are produced by at least one video camera that receives IR light reflections from an individual within a vehicular environment. The gaze can be directed at a target, where the target can be located beyond the vehicle or within the vehicle. The low light condition can occur when the individual is wearing tinted or polarized glasses such as sunglasses. The low light condition causes a low signal-to-noise ratio (SNR) within images received of the individual. The low SNR can be enhanced by summing two or more images, thereby increasing an SNR value. Images can be added to the running sum to further enhance the SNR. When a sufficiently high SNR is achieved, a gaze direction for the individual can be determined.

The flow 100 includes sending 110 an infrared (IR) light source toward an individual within a vehicular environment. The IR light source can be mounted in a variety of positions within the vehicle. The positions can have a line of sight to the individual and can include dashboard, instrument cluster, mirror, steering column, and so on. In embodiments, the IR light source can include near-infrared (NIR) wavelength light. Various wavelengths of NIR light can be used. NIR wavelengths are advantageous in that they can be invisible to human occupants of a vehicle and thereby not distracting nor impacting night vision for a driver trying to observe objects outside the vehicle. Furthermore, NIR wavelength usage can provide consistent illumination of a vehicle cabin, whether it is daytime or nighttime. NIR light source and cameras can then function consistently regardless of the time of day or surrounding environment. The wavelength of NIR light can be based on a video camera or sensor used to receive IR light reflections (discussed below). NIR can be generated or captured by filtering out other wavelengths using a bandpass filter. In the flow 100, the sent IR light source toward an individual is comprised of wavelengths 112 between 800 nm and 1000 nm. Other wavelengths of IR light and NIR light can also be used. In embodiments, the sending of the IR light toward the individual can include a reduction of light in excess of 30% before the IR light reaches an eye of the individual. The light can be reduced by passing through a semitransparent material. The semitransparent material can include a tinted material, a material comprising a polarizer, and the like.

The flow 100 includes receiving 120, by at least one video camera, IR light reflections from the individual, wherein at least one eye of the individual is obscured by a semitransparent material. The at least one video camera can include a visible light camera, a visible light sensor, an IR camera, an IR light sensor, and so on. In embodiments, the receiving IR light reflections can include a further reduction of light in excess of another 30% before the IR light reaches the at least one video camera. The IR light reflected off the individual will experience the additional at least 30% reduction when the reflection passes back through the semitransparent material. The at least one video camera can be mounted in various locations throughout the vehicle. The at least one video camera can have a line of sight to the individual. In the flow 100, the at least one video camera is mounted 122 in, on, above, below, or behind the rearview mirror. The semitransparent material that can obscure a view to at least one eye of the individual can be associated with the rearview mirror. In embodiments, the semitransparent material can include a darkened or tinted rearview mirror. In the flow 100, at least one of the at least one video cameras can be integrated in or mounted on the vehicle's windshield 124. The at least one video camera can be mounted at the top or bottom of the windshield; to the left, right, or center of the windshield; etc. In the flow 100, at least one of the at least one video cameras is integrated in or mounted on the vehicle's dashboard, roof, or steering column 126. The at least one of the at least one video cameras can be mounted within an instrument cluster, an information or control display or panel, etc. Embodiments further include stabilizing the video image frames of the eye received by the at least one video camera, wherein the stabilizing is accomplished in the video camera or in software. Techniques that can accomplish stabilizing the video image frames in the video camera can include optical image stabilization, in-camera-body image stabilization, and so on. Software stabilization techniques can include "de-shake", deblur, and the like. Various types of cameras can be utilized. In some embodiments, a global shutter camera can be used to simultaneously with another image capture device to expose pixels as part of the image capturing. In other embodiments, a rolling shutter camera can be used progressively to expose pixels during the image capture.

The flow 100 includes evaluating low accuracy tracking of the individual 130 using the IR light reflections through the semitransparent material. Since the IR source sent toward the individual can experience a 30% or more decrease, and the IR light reflections from the individual can experience an additional 30% or more decrease, the SNR of the video to be evaluated can be low. In some cases, such as the above progressive decreases in IR light, it will be a known situation where normal tracking will yield a low accuracy. In these cases, initial SNR will not need to be calculated and progression to enhancement of SNR can be implemented. In other situations, evaluation of low accuracy tracking is accomplished by calculating the SNR 132 for the sequence of video image frames captured by the at least one video camera. An SNR value can be calculated for each image frame within the sequence of video image frames. The SNR values associated for the sequence of video image frames can be compared, averaged, normalized, equalized, etc. The evaluating can be used to detect objects that can influence the SNR. Further embodiments can include detecting that the individual is wearing tinted glasses. The tinted glasses, such as sunglasses, can further include polarizers. In embodiments, the tinted glasses can include semitransparent material. In other embodiments, the semitransparent material can include dark or polarizing sunglasses covering at least one eye of the individual.

The flow 100 includes enhancing 140 a signal-to-noise ratio (SNR) for a sequence of video image frames using the IR light reflections of the individual through the semitransparent material. The enhancing can be accomplished using software and hardware techniques. In the flow 100, the enhancing enables detection of feature points 142 in an eye region for the individual. Feature points can include eye features, eyebrow features, and so on. Eye features can include eye corners, width, height, iris diameter, pupil location, and so on. Eyebrow features can include eyebrow corners, width, height, etc. Returning to SNR, the SNR can be enhanced using image analysis techniques such as image filtering, edge detection, contrast adjustment, and so on. The enhancing can be further based on adjusting image frame brightness, exposure, highlights, shadows, brightness, black level, etc. In embodiments, the enhancing the SNR can be further based on the calculating the SNR for the evaluating the low accuracy tracking. In a usage example, the SNR can be evaluated for the sequence of video image frames. The maximum SNR among the calculated SNRs can be assigned to each video frame. Embodiments further can include summing a sequence of at least two video frames captured by the at least one video camera as part of the enhancing the SNR. The summing can include an arithmetic sum, a weighted sum, and so on. In embodiments, the summing can account for person displacement due to vehicular movement between the captured video frames. Vehicular movement can be associated with vehicle bounce associated with road surface roughness, bumps, potholes, etc. In other embodiments, the enhancing can be accomplished by pixel binning. The pixel binning can be accomplished by obtaining values of adjacent pixels. The pixels can be organized in an array such as a 2×2 array, a 4×4 array, and so on. The pixel binning can include adding the SNR values of the adjacent pixels together to form an SNR value for a "super pixel". In embodiments, the pixel binning can be accomplished in a chip sensor in the at least one camera. The pixel binning can also be accomplished using one or more software techniques. In embodiments, the pixel binning can be accomplished in software that obtains data from the at least one camera.

The flow 100 includes determining eye location 150 for the individual based on results of the enhancing a signal-to-noise ratio. The determining eye location can be based on the feature points in an eye region for the individual. In the flow 100, the determining is based on a rate of change for head position 152 of the individual. Change for head position of the individual can include changes in three dimensions. The head position changes can include rotation left or right, up or down; head tilt forward, back, left, right, up, or down; or a combination of rotation, tilt, translation, etc. In the flow 100, the determining eye location can be based on machine learning 154. A network such as a neural network can be trained to determine eye location within one or more video image frames. In the flow 100, the determining is based on a rate of change of vehicle movement 156. The rate of change of vehicle movement can be based on acceleration, deceleration, turning, and so on. The rate of change of vehicle movement can include yaw, pitch, and roll. In embodiments, the determining eye location can account for vehicle bounce between the enhanced sequence of video frames. Discussed previously, vehicle bounce can result from road surface texture, bumps, holes, etc. In embodiments, the determining can include a displacement between adjacent frames captured by the at least one camera. When displacement occurs between adjacent frames, adding the image frames together can cause blur. The blur can be compensated by adding additional images, deblurring the images, and so on. In other embodiments, the determining can include a correction for the displacement between adjacent frames.

The determining eye location can be complicated when a line of sight from an IR source to the individual and the reflection from the individual back to the video camera is partially or completely blocked. Further embodiments can include sensing the occluding of an eye for the individual. The sensing can be based on a sudden substantial change in SNR. The occluding can be caused by normal operation of the vehicle. In embodiments, the occluding can be caused by turning a steering wheel. A spoke associated with the steering wheel can cause the occluding. In other embodiments, the occluding can be caused by the individual's arms when turning the steering wheel. While the occluding is occurring, the gaze direction can be based on a previously determined gaze direction or on one or more other techniques. Further embodiments can include estimating gaze direction during the occluding of the individual's eyes. The estimating can be based on interpolation, extrapolation, etc. The detecting gaze direction can be used to identify unsafe vehicle operation and other hazardous situations. Embodiments further include detecting long duration of eye-closure initiated by microsleep, wherein the detecting is based on the deriving. Detection of long eye-closure can initiate a warning or alert to alert the individual, a switching of the vehicle to autonomous or semiautonomous operation, and so on. Further embodiments can also include identifying a distracted individual, wherein the identifying is based on the deriving. The individual can be alerted to their inattention, the vehicle control can be switched, etc. In some cases, occlusion of an NIR light source occurs due to obstruction by part of an individual or an object within the vehicle. In this case, less light illuminates the driver and the imaging needs to compensate for the loss of illumination.

The flow 100 includes deriving 160 real-time gaze direction of a pupil for the at least one eye, wherein the deriving is based on the determining the eye location. Discussed previously, the derived gaze direction can include a gaze toward a target beyond the vehicle, on the vehicle, within the vehicle, and so on. In embodiments, the deriving real-time gaze direction is accomplished by two or more flashes of IR light. The two or more flashes of IR light can enable receiving, by a video camera, two or more video images. Recall that video frames from the one or more video images can be added together to enhance the SNR. In embodiments, the two or more flashes of IR light can include at least one nearer flash source and at least one farther flash source. The nearer flash source and the farther flash source can enable reflections with different SNRs. In embodiments, the deriving real-time gaze direction can include gaze rate training. The individual's gaze tends to change based on vehicle operation. In embodiments, the rate training can be based on speed of the vehicle. The rate training can be based on other vehicle operation factors that can influence gaze rate. In embodiments, the rate training can be based on bounce of the individual within the vehicle. In some embodiments, a Kalman or Bayesian tracking filter can be applied to the gaze direction to enable better prediction of the future gaze direction. This type of tracking filter uses previous images and gaze direction to predict the next or future direction.

In the flow 100, the deriving real-time gaze direction is accomplished using artificial intelligence (AI) 162 to evaluate the gaze direction of the pupils and a target being observed by the pupil. An AI model can be developed and trained for the evaluating gaze direction and the target observed. In a usage example, an individual gazing in a certain direction can be viewing a vehicle speedometer. Thus, when the individual again gazes in the certain direction, then the AI model can infer that the individual is again viewing the speed indication gauge. Various computer vision techniques can be utilized. In some embodiments, an image is obtained. The driver's head can be found within the image along with features on the head and those features tracked over time. A three-dimensional model of the head can be generated based on fitting to the head features. Based on these features, a head pose can be determined. This head pose can be determined within the interior of the vehicle. Eye regions can be found on the head within the image. The head pose and eye region location can be put into a neural network to define a gaze vector. The gaze vector can be aligned to the three-dimensional model of the head in relation to the vehicle interior. The gaze vector can be projected to a three-dimensional model of the vehicle interior to determine where the driver is looking. In some cases, another neural network is used to define the eye openings. These openings can be used to further refine the gaze direction. The refined gaze direction can be used to identify where the driver is looking. A similar process could be used to determine where different occupants are looking.

Various steps in the flow 100 may be changed in order, repeated, omitted, or the like without departing from the disclosed concepts. Various embodiments of the flow 100 can be included in a computer program product embodied in a non-transitory computer readable medium that includes code executable by one or more processors. Various embodiments of the flow 100, or portions thereof, can be included on a semiconductor chip and implemented in special purpose logic, programmable logic, and so on.

Figure 2:
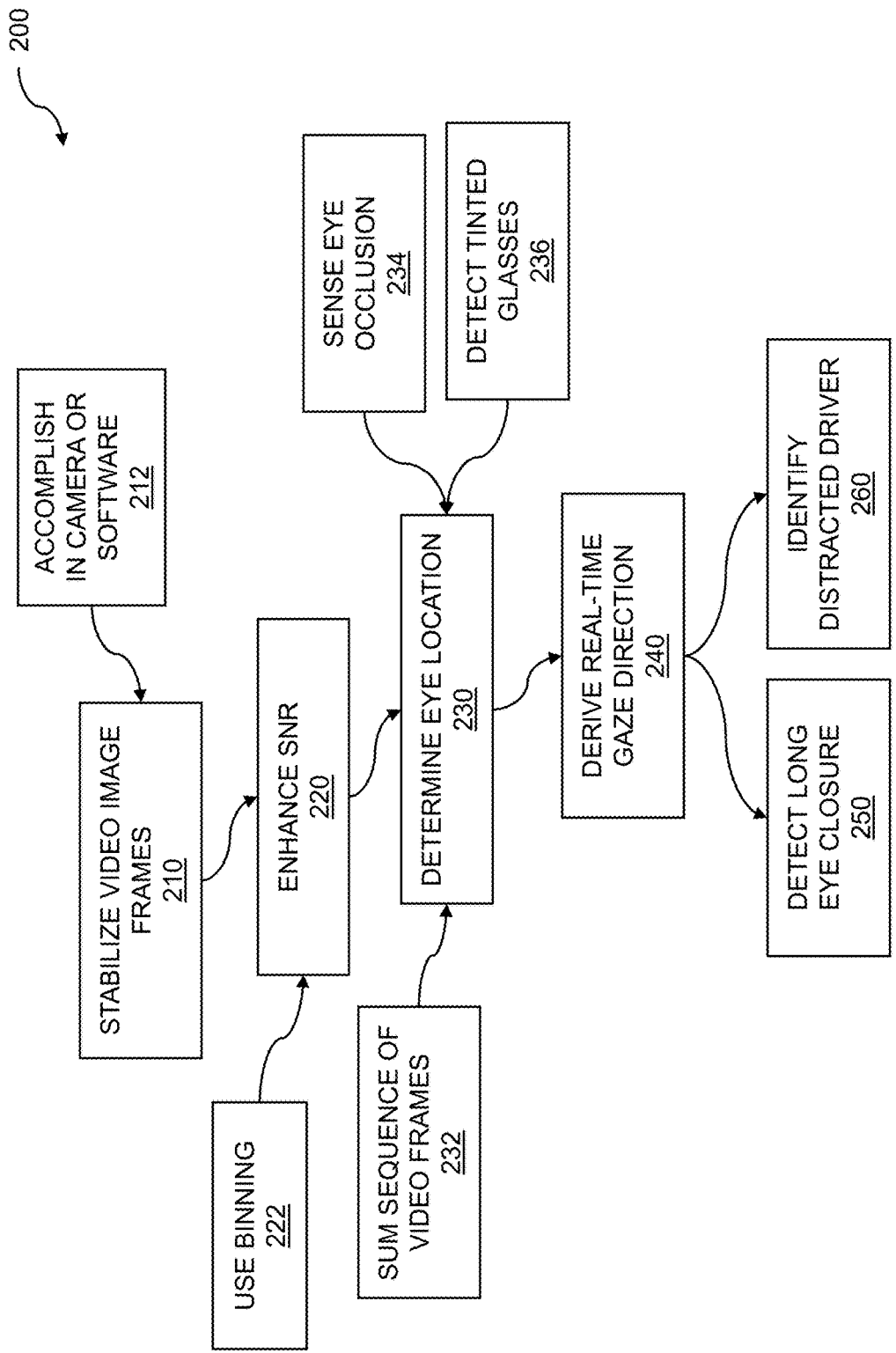
FIG. 2 is a flow diagram for enabling safety features with low light gaze detection in a vehicle environment.

FIG. 2 is a flow diagram for enabling safety features with low light gaze detection in a vehicle environment. Discussed above and throughout, gaze direction of an individual in a vehicle environment can be determined under low light conditions. The low light conditions create poor SNR in received video frames and can be caused by a semitransparent material positioned between the individual and an IR source, and a video camera. The IR source and the camera can be collocated. The gaze direction of the individual that can be derived can be used to adjust gauges, controls, displays, and so on within the vehicle. The gaze direction can also be used to determine that the individual is viewing a travel direction, monitoring other vehicles and road conditions, etc. The gaze direction can also be used to enable safety features for vehicle operation, control, and so on. Image analysis of video frames obtained of the individual in a vehicle enables safety features in a vehicle environment based on low light gaze detection. An infrared (IR) light source is sent toward an individual within a vehicular environment. IR light reflections from the individual are received by at least one video camera, wherein at least one eye of the individual is obscured by a semitransparent material. Low accuracy tracking of the individual is evaluated using the IR light reflections through the semitransparent material. A signal-to-noise ratio (SNR) for a sequence of video image frames is enhanced using the IR light reflections of the individual through the semitransparent material, wherein the enhancing enables detection of feature points in an eye region for the individual. Eye location for the individual is determined based on results of the enhancing a signal-to-noise ratio. Real-time gaze direction of a pupil is derived for the at least one eye, wherein the deriving is based on the determining the eye location.

The flow 200 includes stabilizing 210 the video image frames received by the at least one video camera. The stabilizing can be used to significantly reduce blur in an image received by the video camera. The blur can be caused by motion of the individual, where the motion can result from road bounce, head movement of the individual, and so on. In the flow 200, the stabilizing is accomplished 212 in the video camera or in software. In-lens or in-camera stabilization can include mechanical stabilization or blur reduction within a lens or a camera body, respectively. Software-based stabilization techniques can include optical image stabilization which can be based on digital image stabilization.

The flow 200 includes enhancing 220 a signal-to-noise ratio (SNR) for a sequence of video image frames. The enhancing can be based on image analysis techniques such as deblurring, edge detection, contrast adjustment, exposure, and so on. The enhancing can be accomplished using the IR light reflections of the individual through the semitransparent material. The semitransparent material can include a tinted rearview mirror, sunglasses, polarized glasses or sunglasses, and so on. The enhancing can enable detection of feature points in an eye region for the individual. The feature points can include eye edges, width, and height; eyebrow edges, width, and height; and the like. In embodiments, the enhancing the SNR can be further based on the calculating the SNR for the evaluating the low accuracy tracking. The calculating the SNR can be based on processing pixel values, where the pixels are associated with a video frame containing a face of the individual. Further embodiments can include summing a sequence of at least two video frames captured by the at least one video camera as part of the enhancing the SNR. The summing can include summing values associated with corresponding pixels in the at least two video frames. In the flow 200, the enhancing is accomplished by pixel binning 222. Pixel binning can include obtaining values from adjacent pixels and summing the values to produce a super pixel. The super pixel can have a higher SNR than the individual pixels that were used to produce the super pixel.

The flow 200 includes determining eye location 230 for the individual based on results of the enhancing a signal-to-noise ratio. The determining eye location can be based on detecting feature points in an eye region for an individual. The feature points associated with an eye region can include detecting corners of the eye, calculating eye width and eye height, calculating iris diameter, detecting a pupil associated with the eye, and so on. The feature points can include eyebrow corners, width, height, etc. The flow 200 further includes summing 232 a sequence of at least two video frames captured by the at least one video camera. Discussed above, the summing the sequence of video frames can be part of the enhancing the SNR. The summing can include an arithmetic sum, a weighted sum, and the like. In embodiments, the summing can account for vehicular movement between the captured video frames. The accounting for vehicular movement can be based on an amount of blur present in the image that results from summing the image frames (discussed below). The flow 200 includes sensing occluding 234 of an eye for the individual. The occluding can be caused by a disruption of a line of sight between a video camera and the individual. In embodiments, the occluding can be caused by turning a steering wheel. While turning the steering wheel, one of the spokes of the steering wheel can partially or fully block at least one of the video cameras. In other embodiments, the occluding can be caused by the individual's arms when turning the steering wheel. The individual's arms can block at least one of the video cameras. The flow 200 further includes detecting that the individual is wearing tinted glasses 236. The detecting the wearing of tinted glasses can be based on detecting a semitransparent material located in an eye region associated with the individual. In embodiments, the determining eye location can be based on machine learning. The machine learning can be accomplished by training a network such as a neural network with training data and expected results associated with the training data. The training data can include video image frames that include faces of individuals wearing sunglasses.

The flow 200 includes deriving 240 real-time gaze direction of a pupil for the at least one eye, wherein the deriving is based on the determining the eye location. The deriving can be based on one or more image processing techniques (discussed previously) such as edge detection, contrast adjustment, shadow enhancement, and so on. In embodiments, the deriving real-time gaze direction can be accomplished by two or more flashes of IR light. The two or more flashes of IR light can be used to produce multiple reflections of IR light from the face of the individual. The two or more flashes of IR light can be used to capture two or more video frames. In embodiments, the two or more flashes of IR light can include at least one nearer flash source and at least one farther flash source. The different flash sources can produce substantially similar intensities of IR light or substantially dissimilar intensities. In other embodiments, the deriving real-time gaze direction can include gaze rate training. The gaze rate training can be based on a rate of change of gaze by the individual. In other embodiments, the rate training can be based on speed of the vehicle. As the vehicle accelerates, the rate of gaze training can increase, and as the vehicle decelerates, the rate of gaze training can decrease. In other embodiments, the rate training can be based on bounce of the individual within the vehicle. The bounce of the individual can cause the individual to shift their gaze in order to track their travel path, adjacent vehicles, etc. The deriving real-time gaze direction can be accomplished using artificial intelligence techniques. In embodiments, the deriving real-time gaze direction can be accomplished using artificial intelligence to evaluate the gaze direction of the pupils and a target being observed by the pupil.

The deriving real-time gaze direction can be used to enable safety features within the light-obscured vehicular environment. The flow 200 further includes detecting 250 a long duration of eye-closure initiated by microsleep, wherein the detecting is based on the deriving. The detecting long eye-closure can be used to provide an alert to the individual operating the vehicle. The detecting long eye-closure can further be used to switch control of the vehicle to a semi-autonomous or autonomous control mode. Control of the vehicle can be returned to the individual when the individual recovers. The flow 200 further includes identifying a distracted individual 260, wherein the identifying is based on the deriving. The individual can be distracted by interacting with a handheld device, talking to a second occupant of the vehicle, correcting a misbehaving child or pet, and so on. The detecting a distracted individual can trigger an alert for the individual, can switch control of the vehicle to autonomous or semiautonomous mode, and the like. Control of the vehicle can be returned to the individual once the individual is determined to no longer be distracted.

Various steps in the flow 200 may be changed in order, repeated, omitted, or the like without departing from the disclosed concepts. Various embodiments of the flow 200 can be included in a computer program product embodied in a non-transitory computer readable medium that includes code executable by one or more processors. Various embodiments of the flow 200, or portions thereof, can be included on a semiconductor chip and implemented in special purpose logic, programmable logic, and so on.

Figure 3:
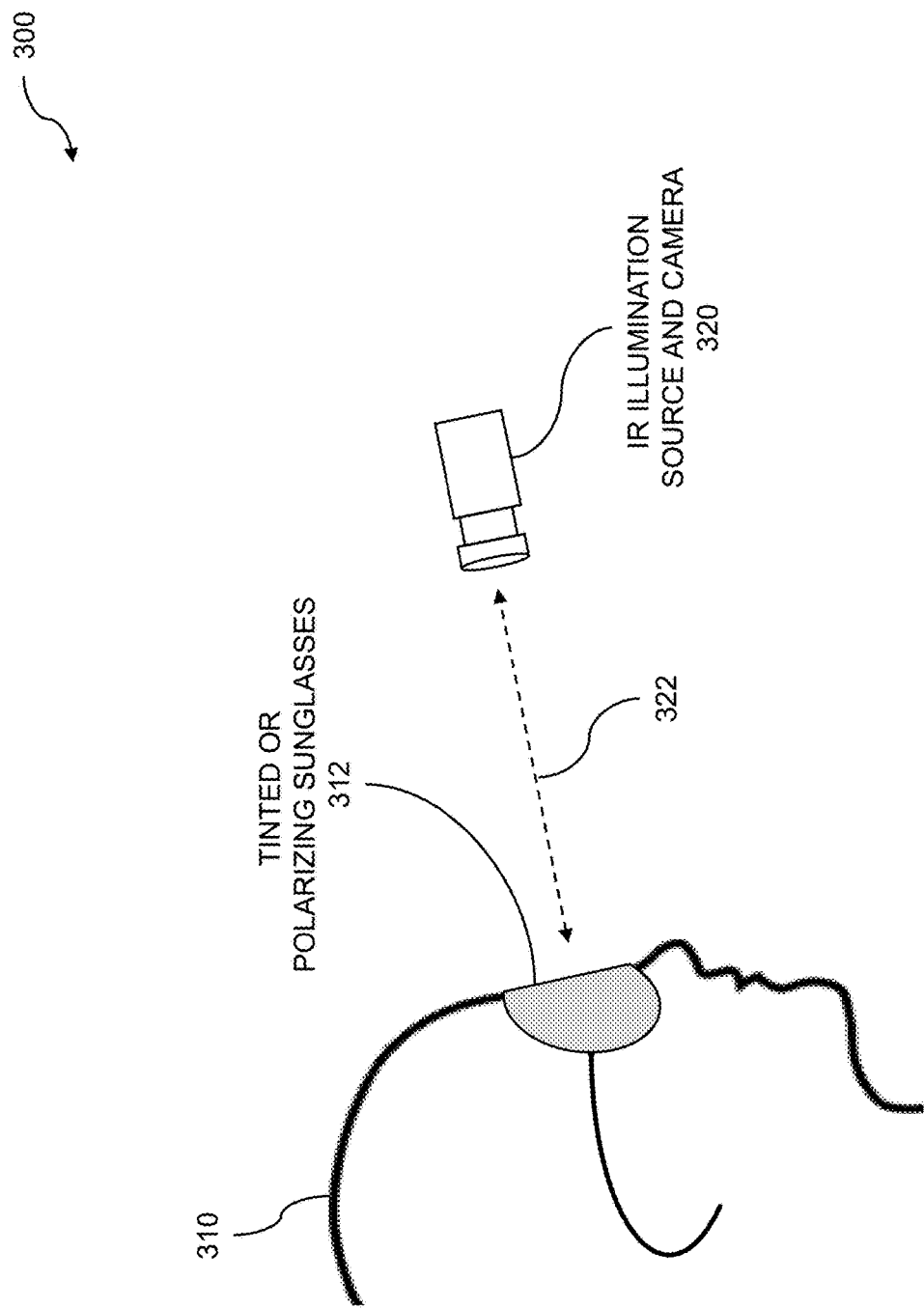
FIG. 3 is a block diagram of an example obscured IR light image.

FIG. 3 is a block diagram of an example obscured IR light image. A vehicle occupant, such as the operator of the vehicle, can wear sunglasses in order to improve their vehicle operating experience. The sunglasses, which can include a semitransparent material such as tinted lenses, polarizers, etc., can reduce the amount of light, glare, and so on that impinges on the vehicle operator's eyes. The sunglasses can also reduce the amount of IR light that passes through the sunglasses, to the individual, and reflects back out through the sunglasses. The sunglasses obscure the vehicle operator's eyes and reduces IR light reflections, thereby reducing the SNR of IR reflections. The IR reflections can be received as a series of video image frames. The series of video image frames can be added together in order to enhance the low SNR of individual video image frames. The enhanced SNR of the combined video image frames enables low light gaze detection in a vehicle environment. An infrared (IR) light source is sent toward an individual within a vehicular environment. IR light reflections from the individual are received by at least one video camera, wherein at least one eye of the individual is obscured by a semitransparent material. A signal-to-noise ratio (SNR) is enhanced for a sequence of video image frames using the IR light reflections of the individual through the semitransparent material, wherein the enhancing enables detection of feature points in an eye region for the individual. Eye location for the individual is determined based on results of the enhancing a signal-to-noise ratio. Real-time gaze direction of a pupil is derived for the at least one eye, wherein the deriving is based on the determining the eye location.

A block diagram of an obscured IR light image is shown 300. An individual 310 can include an occupant of a vehicle such as an operator of the vehicle, a passenger within the vehicle, and so on. The individual can choose to use a semitransparent material to protect their eyes while operating or traveling in the vehicle. The semitransparent material can include tinted lenses, polarized lenses, etc., where the lenses can be associated with sunglasses 312, an eye shade, and so on. An IR light source 320 can be used to send IR light toward the individual 310. The IR source can be combined with, collocated with, etc., a camera such as a video camera. The video camera can include one of at least one video camera. The video camera can receive IR light reflections from the individual via a line of sight 322. While an unobstructed line of sight between the individual and the video camera is shown, the view between sensor and individual can be occluded. In embodiments, the occluding can be caused by turning a steering wheel. The spokes of the steering wheel, while the wheel is being turned, can temporarily partially or fully occlude the line of sight between the individual and the camera. In other embodiments, the occluding can be caused by the individual's arms when turning the steering wheel. The occluding can be resolved by using another video camera, receiving a series of video frames from the at least one camera, and so on. The series of video frames can include occluded views of the individual, partially occluded views, un-occluded views, etc.

Figure 4:
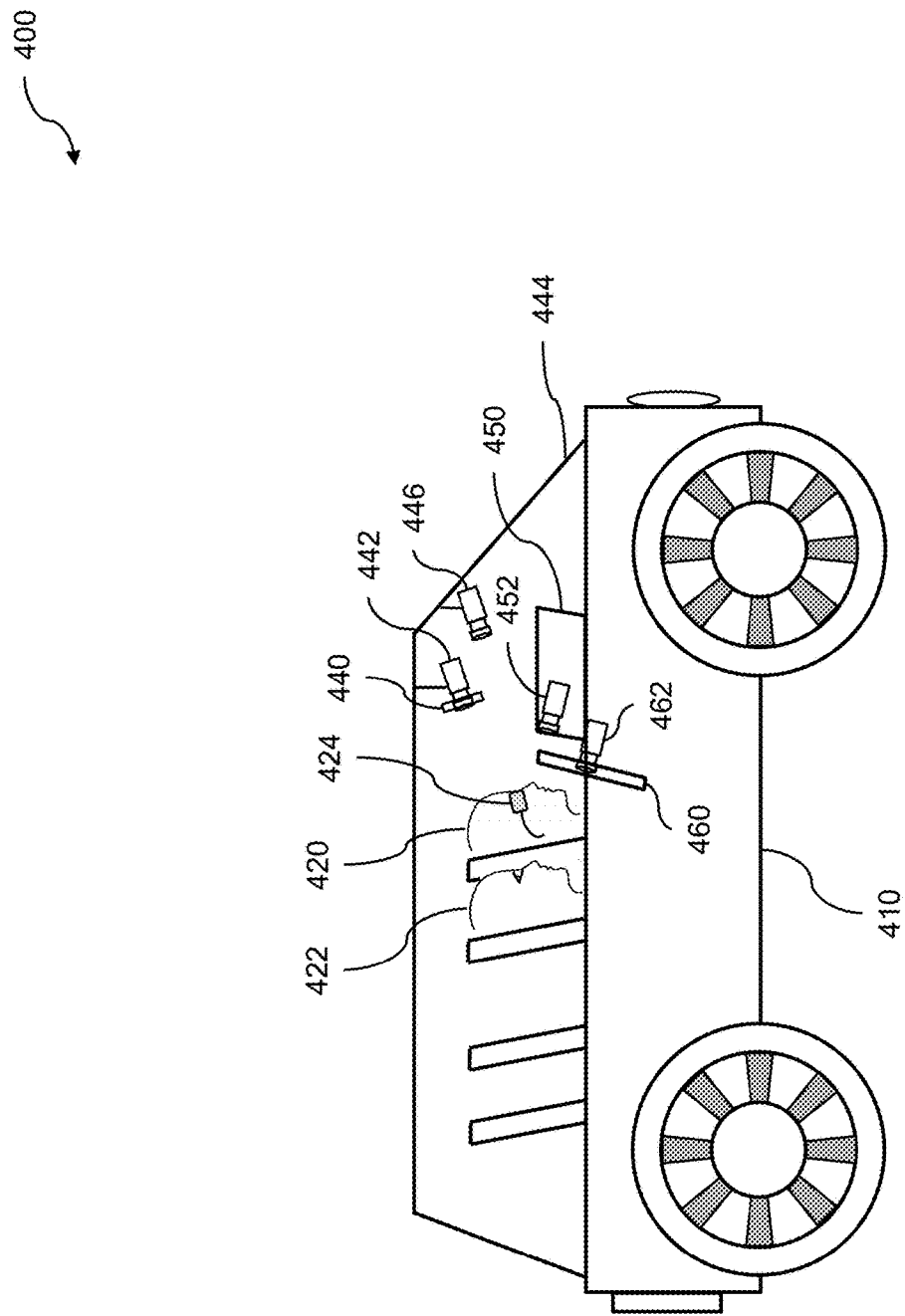
FIG. 4 is a block diagram for capturing obscured IR light reflections.

FIG. 4 is a block diagram 400 for capturing obscured IR light reflections. Low accuracy tracing of an individual can be accomplished using IR light reflected from an individual. The low accuracy tracking can further be accomplished through a semitransparent material such as shaded or polarized glasses worn by the individual. The semitransparent material can further include a tinted rearview mirror, a tinted windshield, and so on. The IR light reflections can further be obscured by a steering wheel operated by the individual. Capturing obscured IR light reflections enables low light gaze detection in a vehicle environment. An infrared (IR) light source is sent toward an individual within a vehicular environment. IR light reflections from the individual are received by at least one video camera, wherein at least one eye of the individual is obscured by a semitransparent material. Low accuracy tracking of the individual is evaluated using the IR light reflections through the semitransparent material. A signal-to-noise ratio (SNR) is enhanced for a sequence of video image frames using the IR light reflections of the individual through the semitransparent material, wherein the enhancing enables detection of feature points in an eye region for the individual. Eye location for the individual is determined based on results of the enhancing a signal-to-noise ratio. Real-time gaze direction of a pupil is derived for the at least one eye, wherein the deriving is based on the determining the eye location.

In embodiments, the determining eye location is based on machine learning. The machine learning system can include a neural network, where the neural network can be trained using one or more training datasets. The datasets can be obtained for a person in a vehicle. The collected datasets can include video data, IR reflections from an individual, and so on. Received IR reflections data and other data can be augmented with synthetic IR reflections data for neural network training as part of machine learning. One or more occupants of a vehicle 410, such as occupants 420 and 422, can be observed using one or more video cameras 442, 446, 452, or 462, and using other IR reflection and image capture techniques. The IR reflection data can include video data. The video data can include low SNR data. The low SNR data can include eye location data. The low SNR data can further include long eye-closure data. The occupant can be a driver 420 of the vehicle 410, a passenger 422 within the vehicle, and so on. The cameras or imaging devices that can be used to obtain images including IR reflection data from the occupants of the vehicle 410 can be positioned to capture the face of the vehicle operator, the face of a vehicle passenger, multiple views of the faces of occupants of the vehicle, and so on. The cameras or imaging devices can detect that the eyes of the operator are obscured by a semitransparent material. The semitransparent material can be associated with tinted, polarized, or other types of sunglasses 424. The cameras can be located near a rear-view mirror 440, such as camera 442; coupled to a windshield 444 of the vehicle 410, such as camera 446; positioned within the dashboard 450, such as camera 452; positioned on or near the dashboard (not shown); positioned on or behind the steering wheel 460 such as camera 462; and so on. In embodiments, additional cameras, imaging devices, etc., can be located throughout the vehicle. In further embodiments, each occupant of the vehicle could have multiple cameras positioned to capture video data from that occupant.

Noted above, the eyes of the vehicle operator can be obscured by a semitransparent material such as lenses of sunglasses. In embodiments, the sending of the IR light toward the individual can include a reduction of light in excess of 30% before the IR light reaches an eye of the individual. The IR light reduction can be associated with the tinted lenses, polarizers, etc., that are included in the sunglasses. The IR light that is reflected from the individual is also reduced by the sunglasses. In further embodiments, the receiving IR light reflections can include a further reduction of light in excess of another 30% before the IR light reaches the at least one video camera. The result of two reductions of the IR light is that the IR reflections that are received by the at least one video camera can have a low SNR. Discussed above and throughout, the SNR can be enhanced by combining a sequence of video image frames. By adding the video image frames together, the SNR of the resulting, summed image can be enhanced or increased. The enhancing the SNR for the sequence of images enables eye location for the individual to be determined. From the determined eye location for the individual, a real-time gaze direction can be derived.

The interior of a vehicle 410 can be a standard vehicle, an autonomous vehicle, a semi-autonomous vehicle, and so on. The vehicle can be a sedan or other automobile, a van, a sport utility vehicle (SUV), a truck, a bus, a special-purpose vehicle, and the like. The interior of the vehicle 410 can include standard controls such as a steering wheel 460, a throttle control (not shown), a brake, and so on. The interior of the vehicle can include other controls such as controls for seats, mirrors, climate systems, audio systems, etc. The controls of the vehicle 410 can be controlled by a controller. The controller can control the vehicle 410 in various manners such as autonomously, semi-autonomously, assertively to a vehicle occupant 420 or 422, etc. In embodiments, the controller provides vehicle control or manipulation techniques, assistance, etc. The controller can receive instructions using wireless techniques. The controller can be pre-programmed to cause the vehicle to follow a specific route. The specific route that the vehicle is programmed to follow can be based on the cognitive state of the vehicle occupant. The specific route can be chosen based on lowest stress, least traffic, most scenic view, shortest route, and so on.

Figure 5:
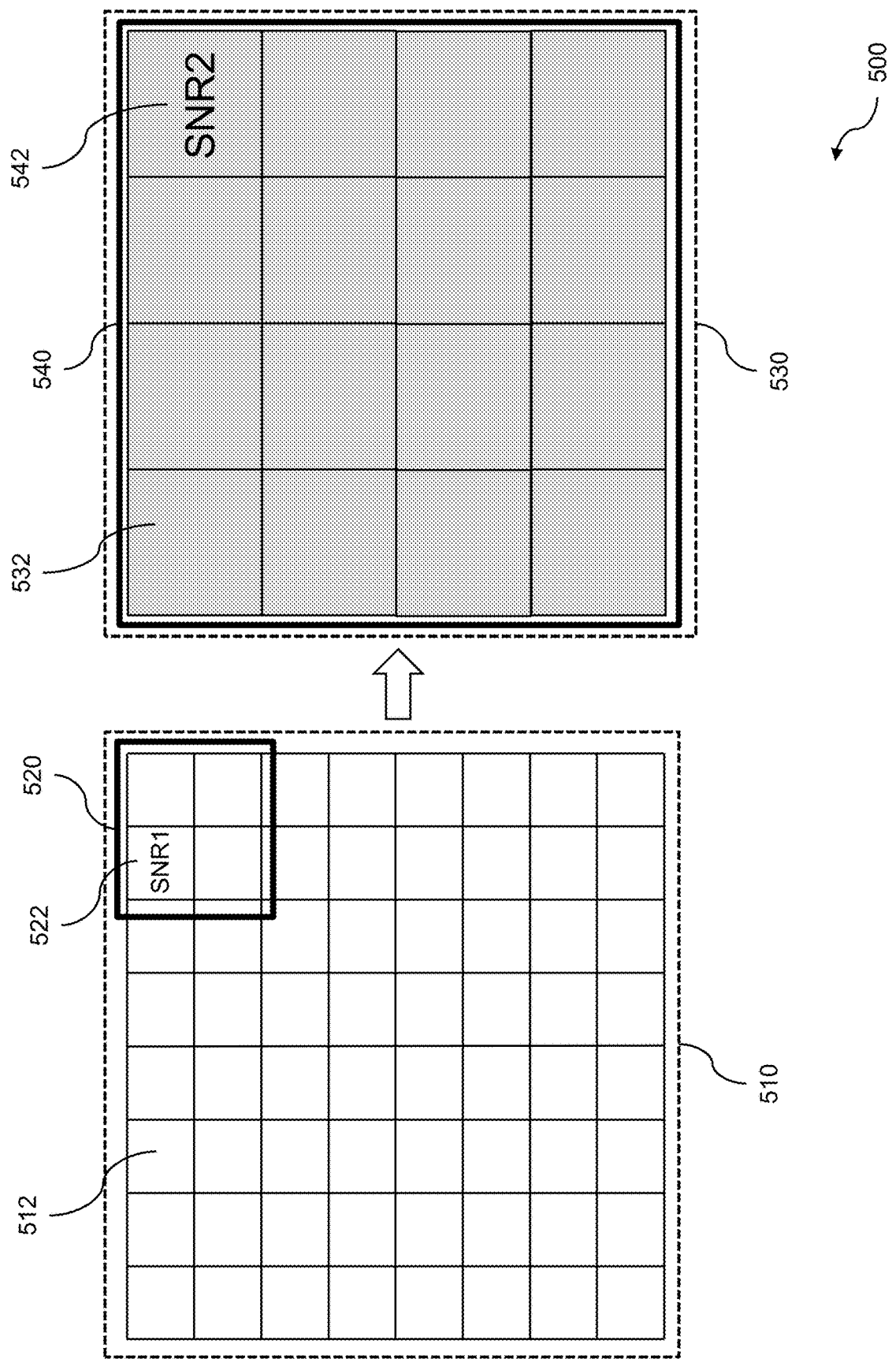
FIG. 5 is a block diagram for pixel binning.

FIG. 5 is a block diagram for pixel binning. Pixel binning is a technique that can be used to combine or "bin" adjacent pixels in a video image, a video frame, and so on. The binning can be based on an arithmetic operation such as addition. The binning is performed to improve the SNR of a combined or "super pixel" in comparison to the SNRs of the individual pixels. The binning enables low light gaze detection in a vehicle environment. An infrared (IR) light source is sent toward an individual within a vehicular environment. IR light reflections from the individual are received by at least one video camera, wherein at least one eye of the individual is obscured by a semitransparent material. Low accuracy tracking of the individual is evaluated using the IR light reflections through the semitransparent material. A signal-to-noise ratio (SNR) is enhanced for a sequence of video image frames using the IR light reflections of the individual through the semitransparent material, wherein the enhancing enables detection of feature points in an eye region for the individual. Eye location for the individual is determined based on results of the enhancing a signal-to-noise ratio. Real-time gaze direction of a pupil is derived for the at least one eye, wherein the deriving is based on the determining the eye location.

The diagram shows example 2×2 and 4×4 pixel binning 500 for a video image. The binning can be performed for a video frame, a still image, and so on. The binning can be accomplished in hardware, in software, or using a combination of hardware and software. The hardware binning can include a clocking technique. Hardware binning can be accomplished by combining electrical charge that was collected by adjacent pixels within a video camera, video sensor, and the like. The pixels can be associated with a complementary metal oxide semiconductor (CMOS) device, a charge coupled device (CCD), etc. The hardware binning can reduce noise, increase SNR, and so on. Software binning can be accomplished by reading and combining values associated with the pixels. The binning effectively reduces the number of individual pixels within a video image or frame, thereby reducing image or frame resolution. In a usage example, the pixels that can be binned can form a square. The square can include 2×2 pixels (4:1 reduction), 3×3 pixels (9:1 reduction), 4×4 pixels (16:1 reduction), and so on. The binning enables increased SNR, reduced camera or sensor noise, etc.

An array of pixels 510 is shown. The array comprises individual pixels such as pixel 512. The pixels of the array can be arranged in a variety of configurations such as a square (discussed previously), a rectangle, and so on. A 2×2 subarray 520 comprises four pixels that can be combined to form a single super pixel. The combining can include adding values associated with the individual pixels within the selected 2×2 group of pixels. The adding the pixels can compute a SNR such as SNR 1 522. The SNR 1 can be associated with a super pixel. The binning of pixels within 2×2 subarrays can continue for the remaining pixels associated with the array. The resulting super pixels can form an array such as array 530, with fewer pixels, higher SNR, and lower noise. The second array 530 can comprise super pixels such as super pixel 532. Note that the binning of pixels can be repeated to further increase SNR. The repeated binning can continue until an SNR can be calculated with a value sufficient to determine gaze direction. In the example shown, the 4×4 group of pixels 520 can be combined to form a second SNR such as SNR 2 542. The value of SNR 2 can be computed by adding the values associated with each super pixel within the array 540.

Figure 6:
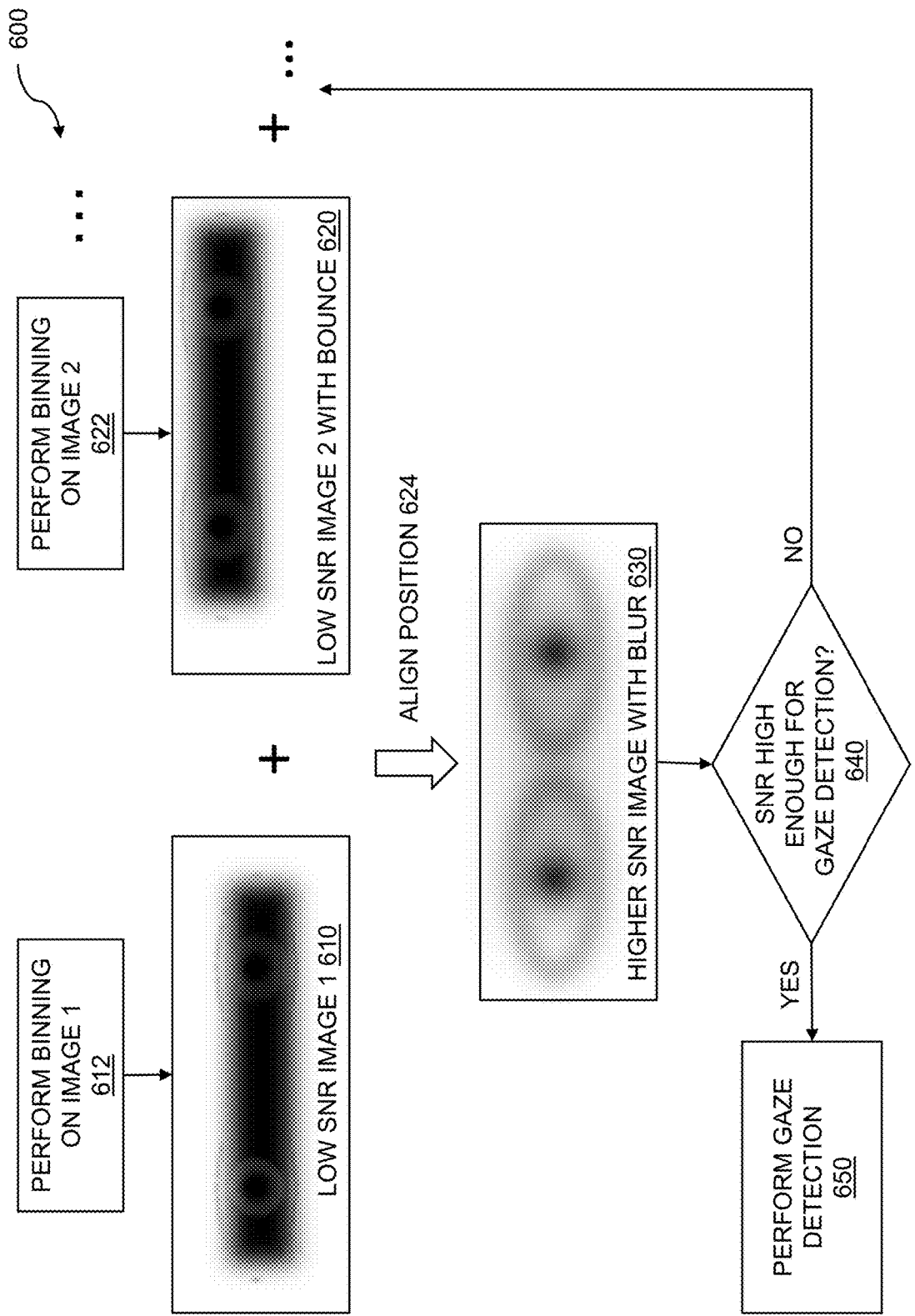
FIG. 6 is a block diagram for combining low SNR video image frames with vehicle bounce.

FIG. 6 is a block diagram for combining low SNR video image frames with vehicle bounce. Discussed previously and throughout, light from an IR source can be sent toward an individual within a vehicle. Reflections from the individual can be received using a video camera, an IR light sensor, and so on. The received reflections can be rendered as video frames where each frame is associated with a low SNR. The SNR can be improved over the SNR of a single video frame by combining two or more low SNR video frames. The combining low SNR video image frames enables low light gaze detection in a vehicle environment. An infrared (IR) light source is sent toward an individual within a vehicular environment. IR light reflections are received from the individual by at least one video camera, wherein at least one eye of the individual is obscured by a semitransparent material. Low accuracy tracking of the individual is evaluated using the IR light reflections through the semitransparent material. A signal-to-noise ratio (SNR) is enhanced for a sequence of video image frames using the IR light reflections of the individual through the semitransparent material, wherein the enhancing enables detection of feature points in an eye region for the individual. Eye location is determined for the individual based on results of the enhancing a signal-to-noise ratio. Real-time gaze direction of a pupil is derived for the at least one eye, wherein the deriving is based on the determining the eye location.

A block diagram 600 for combining low SNR video image frames with vehicle bounce is shown. At least one video camera can receive IR light reflections from the individual within the vehicular environment. The video captured by the at least one video camera comprises frames. Each of the frames can have a low SNR. The low SNR can be associated with IR signal loss through a semitransparent material. Embodiments include detecting that the individual is wearing tinted glasses. The glasses can further be polarized. In embodiments, the tinted glasses can include a semitransparent material. The semitransparent material can cause a reduction in light such as a 30% reduction in light. Two 30% reductions can occur, one from sending the light through the glasses to the individual, and a second when the reflection from the individual passes back through the glasses to the video camera. Low SNR images can include video images such as low SNR image 1 610 and low SNR image 2 620. Image 2 further includes a displacement with respect to image 1. The displacement can be due to vehicle bounce, head tilt, head rotation, etc. Binning can be performed on the images to improve SNR, such as performing binning on image 1 612 and performing binning on image 2 622. Discussed previously, the binning can include summing adjacent pixels within a video image or frame to compute a "super pixel". The super pixel can have an improved SNR with respect to individual pixels.

Image 1 and image 2 can be aligned 624 and summed to produce an image with a higher or improved SNR. The image 630 resulting from the summing of the images can include blur. The blur can be associated with the bounce displacement, head movement, etc. The SNR associated with image 630 resulting from the summing of image 1 and image 2 can be evaluated. The evaluating can be used to determine whether the SNR associated with the higher SNR image with blur is sufficiently high for gaze detection 640. If the SNR is sufficiently high or "yes", then gaze detection 650 can be performed. If the SNR is not sufficiently high or "no", then additional low SNR images can be summed with image 1 and image 2. The adding images and determining whether the resulting SNR is sufficiently high can continue until the SNR is indeed sufficiently high. Once the SNR is sufficiently high, then real-time gaze direction of a pupil for at least one eye of the individual can be derived. The deriving can be based on the determining the eye location with the image with higher SNR.

Figure 7:
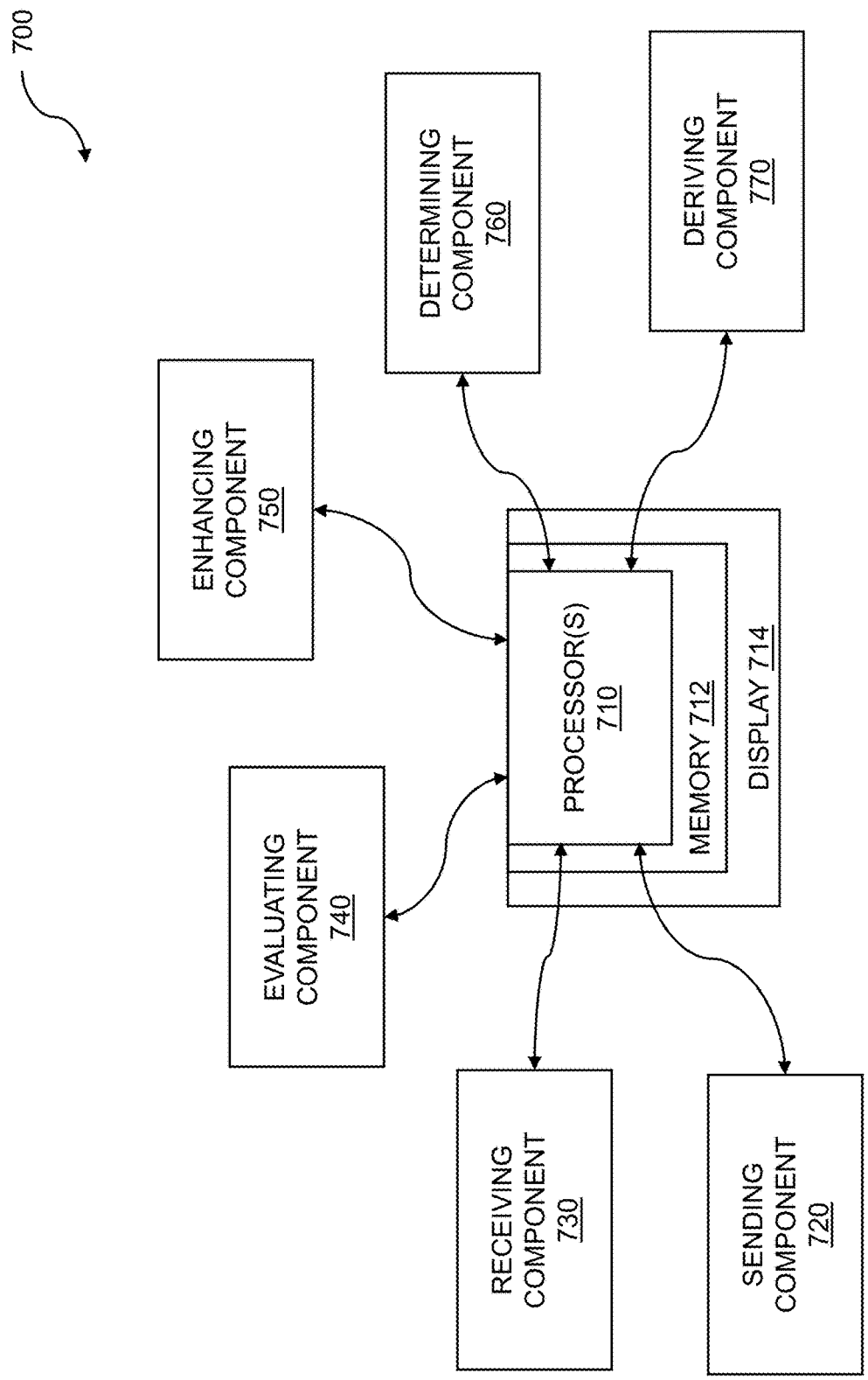
FIG. 7 is a system diagram for low light gaze detection in a vehicle environment.

FIG. 7 is a system diagram for low light gaze detection in a vehicle environment. Vehicle operators perform many tasks while operating the vehicle. A vehicle operator monitors their vehicle speed, road conditions, other vehicles, etc. In addition, the vehicle operator may be adjusting climate control settings, following travel route directions, selecting their favorite urban rush-hour soundtrack, and so on. As a result, the vehicle operator can be required to direct their gaze in many directions and to varying distances. The operator can gaze forward from the vehicle to monitor travel route. The vehicle operator can also gaze from side to side from the vehicle to maintain vehicle position within a lane, to track other vehicles, etc. The operator can further be viewing screens and adjusting settings within the vehicle. Image analysis techniques can be used to detect gaze direction within the vehicle. While images of the vehicle operator can be captured, determination of gaze direction is complicated if the operator's eyes are partially or wholly occluded by sunglasses. The sunglasses or other semitransparent object reduces a view of the vehicle operator's eyes. A computer system can be used for low light gaze detection in a vehicle environment. The system 700 can include one or more processors 710 and a memory 712 which stores instructions. The memory 712 is coupled to the one or more processors 710, wherein the one or more processors 710 can execute instructions stored in the memory 712. The memory 712 can be used for storing instructions, one or more images, signal-to-noise ratio calculations, eye location data, gaze direction data, and the like. Information associated with image analysis, low light gaze direction, etc. can be shown on a display 714 connected to the one or more processors 710. The display can comprise a television monitor, a projector, a computer monitor (including a laptop screen, a tablet screen, a netbook screen, and the like), a smartphone display, a mobile device, or another electronic display.

The system 700 can comprise a computer system for image analysis comprising: a memory which stores instructions; one or more processors coupled to the memory wherein the one or more processors, when executing the instructions which are stored, are configured to: send an infrared (IR) light source toward an individual within a vehicular environment; receive, by at least one video camera, IR light reflections from the individual, wherein at least one eye of the individual is obscured by a semitransparent material; evaluate low accuracy tracking of the individual using the IR light reflections through the semitransparent material; enhance a signal-to-noise ratio (SNR) for a sequence of video image frames using the IR light reflections of the individual through the semitransparent material, wherein the enhancing enables detection of feature points in an eye region for the individual; determine eye location for the individual based on results of the enhancing a signal-to-noise ratio; and derive real-time gaze direction of a pupil for the at least one eye, wherein the deriving is based on the determining the eye location.

The system 700 can include a sending component 720. The sending component 720 can send an infrared (IR) light source toward an individual within a vehicular environment. In embodiments, the IR light source can include near infrared wavelength (NIR) light. The IR light that is sent can include flashes of IR lights. In embodiments, the IR light sent toward an individual can be comprised of wavelengths between 800 nm and 1000 nm. In some embodiments, the wavelength is between 850 nm and 940 nm. More than one IR light source can be used to accomplish the sending. The IR light source can be positioned at various locations within the vehicle. The light source can have a line of sight to the individual. The line of sight can be partially obscured. The IR light that is sent toward the individual can be reduced. The reducing the IR light can result from the IR light passing through a semitransparent medium, a filter, a polarizer, and so on. In embodiments, the sending of the IR light toward the individual can include a reduction of light in excess of 30% before the IR light reaches an eye of the individual. The semitransparent medium can include sunglasses which can be worn by the individual.

The system 700 can include a receiving component 730. The receiving component 730 can receive, by at least one video camera, IR light reflections from the individual, wherein at least one eye of the individual is obscured by a semitransparent material. The at least one video camera can include an IR-only video camera. The at least one video camera may be able to capture further wavelengths of light such as visible light. The IR light that is received can be further reduced. In embodiments, the receiving IR light reflections can include a further reduction of light in excess of another 30% before the IR light reaches the at least one video camera. The at least one video camera can be positioned at various locations within the vehicle. In embodiments, the at least one camera can be mounted in, on, or behind the rearview mirror. Other positions for the at least one video camera are also possible. In further embodiments, at least one of the at least one video cameras can be integrated in or mounted on the vehicle's dashboard, roof, windshield, or steering column. Receiving the IR light reflections can be complicated by the individual changing head tilt, looking in a direction other than straight forward, and so on. Receiving the IR reflections can be further complicated by vehicle-based causes such as vehicle bounce. Further embodiments can include stabilizing the video image frames received by the at least one video camera, wherein the stabilizing is accomplished in the video camera or in software. The stabilizing can be accomplished using antivibration components, antivibration software, etc.

The system 700 can include an evaluating component 740. The evaluating component 740 can evaluate low accuracy tracking of the individual using the IR light reflections through the semitransparent material. The evaluating component can apply a variety of image processing techniques. In embodiments, the evaluating the low accuracy tracking can be accomplished by calculating the SNR for a sequence of video image frames captured by the at least one video camera. The sequence of video image frames can include frames collected as a burst of images, images collected periodically, and so on. The evaluating the image can include identifying a face within an image, locating facial features, locating facial landmarks, and the like.

The system 700 can include an enhancing component 750. The enhancing component 750 can enhance a signal-to-noise ratio (SNR) for a sequence of video image frames using the IR light reflections of the individual through the semitransparent material, wherein the enhancing enables detection of feature points in an eye region for the individual. Feature points in an eye can include corners, width, height, and so on. Detection of feature points in the eye region can further include eyebrow corners, width, and height. The enhancing can include enhancing the SNR. In embodiments, the enhancing the SNR can be further based on the calculating the SNR for the evaluating the low accuracy tracking. The enhancing can include image filtering, contrast adjustment, edge detections, deblurring, etc. Further embodiments can include summing a sequence of at least two video frames captured by the at least one video camera as part of the enhancing the SNR. The video frames that are summed can include video frames obtained from a burst capture of video, from frames obtained periodically, etc. In embodiments, the summing can account for vehicular movement between the captured video frames. Vehicular movement can include movement associated with vehicle bounce. In other embodiments, the enhancing can be accomplished by pixel binning. The pixel binning is a technique that can be used to reduce electrical noise and to increase SNR of pixels associated with a video sensor connected to the at least one video camera. The pixel binning can be accomplished in hardware, software, etc. In embodiments, the pixel binning can be accomplished in a chip sensor in the at least one camera. The chip sensor can include a CMOS sensor, a CCD sensor, and the like. In other embodiments, the pixel binning can be accomplished in software that obtains data from the at least one camera.

The system 700 can include a determining component 760. The determining component 760 can determine eye location for the individual based on results of the enhancing a signal-to-noise ratio. The determining eye location can be based on examining pixels associated with video frames in the regions of the feature points in the eye. The determining can further be based on edge detection and image frame adjustment such as brightness, contrast, highlights, shadows, brilliance, black point, etc. In embodiments, the determining eye location can account for vehicle bounce between the enhanced sequence of video frames. The vehicle bounce can be attributable to bumps or holes in a roadway, and so on. In embodiments, the determining can include a displacement between adjacent frames captured by the at least one camera. The displacement between frames can further be based on head movement, where the head movement can be correlated with a vehicle bounce event. In other embodiments, the determining can include a correction for the displacement between adjacent frames. The correction can be based on a counterrotation, a translation, and so on. In embodiments, the determining can be based on a rate of change of vehicle movement. The rate of change of vehicle movement can be associated with vehicle acceleration, deceleration, turning, etc. In other embodiments, the determining can be based on a rate of change for head position of the individual. The displacement between frames can further be based on head tilt, head rotation, etc. In further embodiments, the determining eye location can be based on machine learning. The machine learning can be performed on a network such as a neural network. The neural network can be trained using training data and corresponding expected inferences or results associated with the data.

The system 700 can include a deriving component 770. The deriving component 770 can derive real-time gaze direction of a pupil for the at least one eye, wherein the deriving is based on the determining the eye location. The gaze direction can be forward from the vehicle, side to side from the vehicle, downward toward an instrument cluster or information center, to the side to converse with a passenger within the vehicle, and so on. In embodiments, the deriving real-time gaze direction can be accomplished by two or more flashes of IR light. The two or more flashes can be used to enhance image SNR, to detect displacement of the individual such as due to a bounce, to detect head tilt or rotation, and so on. The IR flashes can originate from more than one IR source. In embodiments, the two or more flashes of IR light can include at least one nearer flash source and at least one farther flash source. In other embodiments, the deriving real-time gaze direction can include gaze rate training. The gaze rate can be based on gazing in different directions from the vehicle, gazing at various instruments and controls within the vehicle, etc. In embodiments, the rate training can be based on speed of the vehicle. The individual's eyes can change gaze direction more quickly at higher vehicular speeds than at lower vehicular speeds. In other embodiments, the rate training can be based on bounce of the individual within the vehicle. The rate and magnitude of bounce of the individual can vary based on vehicle speed. In further embodiments, the deriving real-time gaze direction can be accomplished using artificial intelligence to evaluate the gaze direction of the pupils and a target being observed by the pupil. The artificial intelligence can be used to track the movement of the pupil, to determine a gaze target, etc.

The determining gaze direction can be complicated by normal operation of the vehicle, eyewear associated with the individual, and so on. Embodiments can further include sensing occluding of an eye for the individual. The occluding of an eye can be associated with a temporary blocking or "blinding" of an IR light source, a video camera, and so on. In embodiments, the occluding can be caused by turning a steering wheel. One or more arms or spokes of the steering wheel can cover or block one or more IR light source or video camera. In other embodiments, the occluding can be caused by the individual's arms when turning the steering wheel. The individual's arm can block an IR source or video camera. Further embodiments include estimating gaze direction during the occluding of the individual's eyes. The estimating gaze direction can be based on last known gaze direction, a rate of change of position of an eye between video frames, etc. In addition to determining gaze direction, tracking at least one eye of the individual can be used to enhance vehicle operation safety. Further embodiments include detecting long eye-closure initiated by microsleep, wherein the detecting is based on the deriving. The individual may not respond quickly to traffic conditions, may not track turns along the travel route, may drift between travel lanes, and so on. Further embodiments also include identifying a distracted individual, wherein the identifying is based on the deriving. The derived gaze direction may be away from the direction of travel, tracking other vehicles, and the like.

The system 700 can include a computer program product embodied in a non-transitory computer readable medium for image analysis, the computer program product comprising code which causes one or more processors to perform operations of: sending an infrared (IR) light source toward an individual within a vehicular environment; receiving, by at least one video camera, IR light reflections from the individual, wherein at least one eye of the individual is obscured by a semitransparent material; evaluating low accuracy tracking of the individual using the IR light reflections through the semitransparent material; enhancing a signal-to-noise ratio (SNR) for a sequence of video image frames using the IR light reflections of the individual through the semitransparent material, wherein the enhancing enables detection of feature points in an eye region for the individual; determining eye location for the individual based on results of the enhancing a signal-to-noise ratio; and deriving real-time gaze direction of a pupil for the at least one eye, wherein the deriving is based on the determining the eye location.

Each of the above methods may be executed on one or more processors on one or more computer systems. Embodiments may include various forms of distributed computing, client/server computing, and cloud-based computing. Further, it will be understood that the depicted steps or boxes contained in this disclosure's flow charts are solely illustrative and explanatory. The steps may be modified, omitted, repeated, or re-ordered without departing from the scope of this disclosure. Further, each step may contain one or more sub-steps. While the foregoing drawings and description set forth functional aspects of the disclosed systems, no particular implementation or arrangement of software and/or hardware should be inferred from these descriptions unless explicitly stated or otherwise clear from the context. All such arrangements of software and/or hardware are intended to fall within the scope of this disclosure.

The block diagrams and flowchart illustrations depict methods, apparatus, systems, and computer program products. The elements and combinations of elements in the block diagrams and flow diagrams, show functions, steps, or groups of steps of the methods, apparatus, systems, computer program products and/or computer-implemented methods. Any and all such functions—generally referred to herein as a "circuit," "module," or "system"— may be implemented by computer program instructions, by special-purpose hardware-based computer systems, by combinations of special purpose hardware and computer instructions, by combinations of general-purpose hardware and computer instructions, and so on.

A programmable apparatus which executes any of the above-mentioned computer program products or computer-implemented methods may include one or more microprocessors, microcontrollers, embedded microcontrollers, programmable digital signal processors, programmable devices, programmable gate arrays, programmable array logic, memory devices, application specific integrated circuits, or the like. Each may be suitably employed or configured to process computer program instructions, execute computer logic, store computer data, and so on.

It will be understood that a computer may include a computer program product from a computer-readable storage medium and that this medium may be internal or external, removable and replaceable, or fixed. In addition, a computer may include a Basic Input/Output System (BIOS), firmware, an operating system, a database, or the like that may include, interface with, or support the software and hardware described herein.

Embodiments of the present invention are neither limited to conventional computer applications nor the programmable apparatus that run them. To illustrate: the embodiments of the presently claimed invention could include an optical computer, quantum computer, analog computer, or the like. A computer program may be loaded onto a computer to produce a particular machine that may perform any and all of the depicted functions. This particular machine provides a means for carrying out any and all of the depicted functions.

Any combination of one or more computer readable media may be utilized including but not limited to: a non-transitory computer readable medium for storage; an electronic, magnetic, optical, electromagnetic, infrared, or semiconductor computer readable storage medium or any suitable combination of the foregoing; a portable computer diskette; a hard disk; a random access memory (RAM); a read-only memory (ROM); an erasable programmable read-only memory (EPROM, Flash, MRAM, FeRAM, or phase change memory); an optical fiber; a portable compact disc; an optical storage device; a magnetic storage device; or any suitable combination of the foregoing. In the context of this document, a computer readable storage medium may be any tangible medium that can contain or store a program for use by or in connection with an instruction execution system, apparatus, or device.

It will be appreciated that computer program instructions may include computer executable code. A variety of languages for expressing computer program instructions may include without limitation C, C++, Java, JavaScript™, ActionScript™, assembly language, Lisp, Perl, Tcl, Python, Ruby, hardware description languages, database programming languages, functional programming languages, imperative programming languages, and so on. In embodiments, computer program instructions may be stored, compiled, or interpreted to run on a computer, a programmable data processing apparatus, a heterogeneous combination of processors or processor architectures, and so on. Without limitation, embodiments of the present invention may take the form of web-based computer software, which includes client/server software, software-as-a-service, peer-to-peer software, or the like.

In embodiments, a computer may enable execution of computer program instructions including multiple programs or threads. The multiple programs or threads may be processed approximately simultaneously to enhance utilization of the processor and to facilitate substantially simultaneous functions. By way of implementation, any and all methods, program codes, program instructions, and the like described herein may be implemented in one or more threads which may in turn spawn other threads, which may themselves have priorities associated with them. In some embodiments, a computer may process these threads based on priority or other order.

Unless explicitly stated or otherwise clear from the context, the verbs "execute" and "process" may be used interchangeably to indicate execute, process, interpret, compile, assemble, link, load, or a combination of the foregoing. Therefore, embodiments that execute or process computer program instructions, computer-executable code, or the like may act upon the instructions or code in any and all of the ways described. Further, the method steps shown are intended to include any suitable method of causing one or more parties or entities to perform the steps. The parties performing a step, or portion of a step, need not be located within a particular geographic location or country boundary. For instance, if an entity located within the United States causes a method step, or portion thereof, to be performed outside of the United States, then the method is considered to be performed in the United States by virtue of the causal entity.

While the invention has been disclosed in connection with preferred embodiments shown and described in detail, various modifications and improvements thereon will become apparent to those skilled in the art. Accordingly, the forgoing examples should not limit the spirit and scope of the present invention; rather it should be understood in the broadest sense allowable by law.

What is claimed is:

1. A computer-implemented method for image analysis comprising:
    sending an infrared (IR) light source toward an individual within a vehicular environment;
    receiving, by at least one video camera, IR light reflections from the individual, wherein at least one eye of the individual is obscured by a semitransparent material;
    evaluating low accuracy tracking of the individual using the IR light reflections through the semitransparent material;
    enhancing a signal-to-noise ratio (SNR) for a sequence of video image frames using the IR light reflections of the individual through the semitransparent material, wherein the enhancing enables detection of feature points in an eye region for the individual;
    determining eye location for the individual based on results of the enhancing a signal-to-noise ratio; and
    deriving real-time gaze direction of a pupil for the at least one eye, wherein the deriving is based on the determining the eye location.

2. The method of claim 1 wherein the evaluating the low accuracy tracking is accomplished by calculating the SNR for the sequence of video image frames captured by the at least one video camera.

3. The method of claim 2 wherein the enhancing the SNR is further based on the calculating the SNR for the evaluating the low accuracy tracking.

4. The method of claim 1 wherein the IR light source includes near infrared wavelength light.

5. The method of claim 1 further comprising detecting that the individual is wearing tinted glasses.

6. The method of claim 5 wherein the tinted glasses include the semitransparent material.

7. The method of claim 1 further comprising summing a sequence of at least two video frames captured by the at least one video camera as part of the enhancing the SNR.

8. The method of claim 1 wherein the sending of the IR light toward the individual includes a reduction of light in excess of 30% before the IR light reaches an eye of the individual.

9. The method of claim 8 wherein the receiving IR light reflections includes a further reduction of light in excess of another 30% before the IR light reaches the at least one video camera.

10. The method of claim 1 wherein the deriving real-time gaze direction is accomplished by two or more flashes of IR light.

11. The method of claim 10 wherein the two or more flashes of IR light include at least one nearer flash source and at least one farther flash source.

12. The method of claim 1 wherein the deriving real-time gaze direction includes gaze rate training.

13. The method of claim 12 wherein the rate training is based on speed of the vehicle.

14. The method of claim 1 wherein the deriving real-time gaze direction is accomplished using artificial intelligence to evaluate the gaze direction and a target being observed by the pupil.

15. The method of claim 1 wherein the determining eye location accounts for head position change due to vehicle bounce between the enhanced sequence of video frames.

16. The method of claim 15 wherein the determining includes a displacement between adjacent frames captured by the at least one camera.

17. The method of claim 16 wherein the determining includes a correction for the displacement between adjacent frames.

18. The method of claim 1 further comprising sensing occluding of an eye for the individual.

19. The method of claim 18 further comprising estimating gaze direction during the occluding of the individual's eyes.

20. The method of claim 1 further comprising detecting long eye-closure initiated by microsleep, wherein the detecting is based on the deriving.

21. The method of claim 1 further comprising identifying a distracted individual, wherein the identifying is based on the deriving.

22. The method of claim 1 wherein the semitransparent material includes a darkened rearview mirror.

23. The method of claim 1 wherein the IR light source sent toward an individual is comprised of wavelengths between 800 nm and 1000 nm.

24. The method of claim 1 further comprising stabilizing the video image frames received by the at least one video camera, wherein the stabilizing is accomplished in the video camera or in software.

25. A computer program product embodied in a non-transitory computer readable medium for image analysis, the computer program product comprising code which causes one or more processors to perform operations of:
    sending an infrared (IR) light source toward an individual within a vehicular environment;
    receiving, by at least one video camera, IR light reflections from the individual, wherein at least one eye of the individual is obscured by a semitransparent material;

evaluating low accuracy tracking of the individual using the IR light reflections through the semitransparent material;

enhancing a signal-to-noise ratio (SNR) for a sequence of video image frames using the IR light reflections of the individual through the semitransparent material, wherein the enhancing enables detection of feature points in an eye region for the individual;

determining eye location for the individual based on results of the enhancing a signal-to-noise ratio; and deriving real-time gaze direction of a pupil for the at least one eye, wherein the deriving is based on the determining the eye location.

26. A computer system for image analysis comprising:

a memory which stores instructions;

one or more processors coupled to the memory wherein the one or more processors, when executing the instructions which are stored, are configured to:

send an infrared (IR) light source toward an individual within a vehicular environment;

receive, by at least one video camera, IR light reflections from the individual, wherein at least one eye of the individual is obscured by a semitransparent material;

evaluate low accuracy tracking of the individual using the IR light reflections through the semitransparent material;

enhance a signal-to-noise ratio (SNR) for a sequence of video image frames using the IR light reflections of the individual through the semitransparent material, wherein enhancing enables detection of feature points in an eye region for the individual;

determine eye location for the individual based on results of the enhancing a signal-to-noise ratio; and derive real-time gaze direction of a pupil for the at least one eye, wherein deriving is based on determining the eye location.

\* \* \* \* \*